Nov. 13, 1951 D. L. GREENE ET AL 2,574,781
BUS BAR CONNECTOR
Filed Dec. 22, 1947
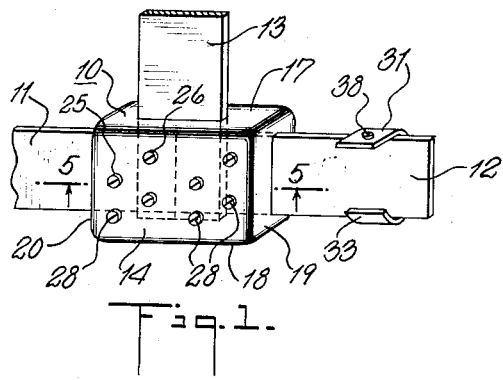
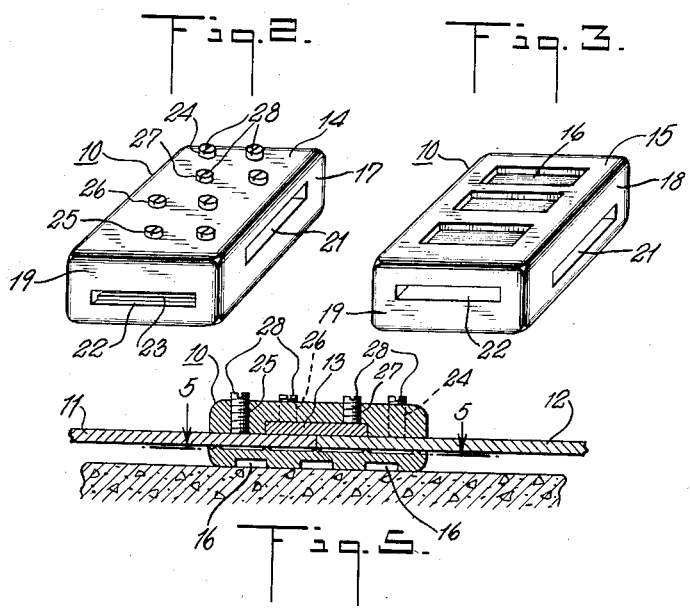
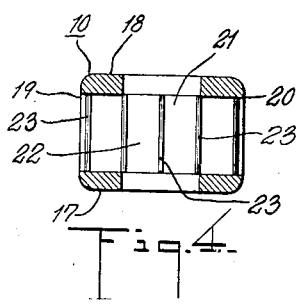
INVENTOR.
CARROLL A. BADEAU
DONALD L GREENE
BY
ATTORNEY

UNITED STATES PATENT OFFICE 2,574,781

BUS BAR CONNECTOR

Donald L. Greene, Reading, Pa., and Carroll A. Badeau, Westfield, N. J., assignors to The Thomas & Betts Co., Elizabeth, N. J., a corporation of New Jersey Application December 22, 1947, Serial No. 793,198

5 Claims. (Cl. 174—94)

The invention relates to an improvement in electric systems of the flat, non-insulated bus bar type, not particularly intended constantly to carry a live load but employed as the occasion arises as a system for grounding lightning and other momentarily high charges of electricity on to the metal framework of a building.

It is an economical requirement in such systems that the coupled together conductors leading to the final terminal ground have capacity to carry the often extremely high current charges imposed thereon momentarily from time to time and to do this without deleteriously affecting the system. In a practical way the conductors as now used are for the most part heavy, flat, solid copper bus bars usually cut to linear size and preferably mounted on steel beams, or otherwise supported on or from a cellar or like walls of the building, as is usual in such cases. Of course, such systems must employ some form of connector at the juncture of the different lengths of flat bus bars which are dimensioned linearly to fit the structural parts of a building; and it is at this juncture point where failures of the system are most likely to occur, especially when the system is subjected to a lightning stroke or other unusually high voltage shocks.

The primary object of the invention is to provide a simplified and easily fabricated form of electric grounding system and specifically to improve the jointure element or connector used between the cut-off lengths of the bus bars to provide extensive and large area interbearing surfaces between the bus bars when disposed in overlapping relation and to provide the largest possible interengaging surfaces between each bus bar and the connector.

These jointure forming connectors are intended to have at least the operative load carrying capacity of the associated bus bars, and are otherwise designed so as to minimize structural failures when subjected momentarily to an overload.

This objective is attained in the illustrated embodiment of the invention by providing a rugged block-like one-piece metallic connector, formed preferably of cast bronze, and otherwise fashioned to give maximum structural strength as well as high current carrying capacity and to obtain these objectives with the use of the least possible amount of material. The connectors herein disclosed are formed to receive the bus bars inserted therein without necessity of prepreparing either the connectors or the bus bars, and which bus bars are rigidly clamped thereto in such way as will provide an electrical path of extensive interengaging surfaces between the related bus bars. This objective calls for powerfully reacting clamping means between the connector and bus bars and between overlapping portions of the bus bars and which clamping means has a tendency to distort the connector when so clamped into a forceful engagement with bus bars. Accordingly, present disclosure features a substantially solid form of connector somewhat tubular in design and in general organized to distribute distorting loads more or less uniformly over the entire area thereof and which connectors are particularly fabricated to withstand any distorting strains imposed thereon by the clamping means.

Another object of the invention and featuring economy in the preforming and installation of the system is to provide a grounding system which can be custom-made and fitted in situ from standardized stock parts with no more installing equipment used than a saw for cutting the copper bars to the desired length and a screw driver or wrench for securing the connector by screw pressure to the bars. With this objective, stock lengths of the copper bus bars may be cut to the desired lengths as may be needed and, by utilizing the novel form of connector herein featured, the cut-off lengths of the bars may be assembled to form with the same type of standard stock connector selectively either splicers, T's, L's or crosses, as the situation indicates.

Various other objects and advantages of the invention will be in part obvious from an inspection of the accompanying drawings and in part will be more fully set forth in the following particular description of one means of practicing the invention.

In the accompanying drawing:

Fig. 1 is a view in elevation of a corner of a grounding system shown in position ready to be mounted on a supporting wall; showing the juncture of three bus bars forming a T, with a connector therefor constituting a preferred embodiment of the connector aspect of the invention and showing a supporting bracket for one of the bars.

Figs. 2-4 inclusive are views of the connector shown in the preceding figures; Figs. 2 and 3 being perspective views showing respectively the front or top and the rear or bottom flat sides of the connector; and Fig. 4 being a sectional view taken on a plane parallel to the flat surfaces and looking downwardly as viewed from the plane 5—5 of Fig. 5; and Fig. 5 is a transverse sectional view taken midlength of the showing in Fig. 1, and taken on the line 6—6 of Fig. 1 with the supporting bracket or clip omitted.

The grounding system herein disclosed is formed solely of three stock parts, bus bars, block-like clamping connectors and wall brackets or clips for supporting the bus bars and thus the fabricated system considered as a unit from a supporting wall.

Referring first to the assembly as shown in Fig. 1, there is disclosed the adjacent ends of three bus bars inserted into a common one-piece block-like connector 10. These bars have their adjacent ends inserted into slots, recesses or passages provided therefor in the connector and are demountably secured thereto by gangs of binding screws. Two of the bars 11 and 12 are disposed in horizontal alignment, in end-to-end abutting relation and the third upstanding bar 13 back-laps the abutting ends of the bars 11 and 12 in positive electric and in firm mechanical bearing engagement therewith as best shown in Fig. 5. In Fig. 1 the bar 13 extends at right angles to the aligned bars 11 and 12 to form a T type of connection.

The connector 10 is formed of a solid one-piece block of bronze cast to shape and subsequently machined to finished form and in general the block is designed to utilize functionally all of the material present and thus provides in effect a substantially closed structure somewhat tubular in two directions and which will tend by reason of its design to resist distorting strains imposed thereon by the clamping means hereinafter described. The connector is of rectangular form substantially a regular parallelepiped, with rounded corners and with opposing flat faces forming a front or top face 14 and a rear or bottom face 15. The rear face is intended to abut the supporting wall and to space the bus bars therefrom as shown in Fig. 5. In order to save weight in the material and perhaps to minimize the accumulation of dampness between the wall and the connector, the rear face 15 is provided with a series of shallow, parallel grooves or recesses 16 as shown in Figs. 3 and 5. The connector is outlined by four narrow edge walls forming a pair of opposing long walls 17 and 18 and a pair of relatively shorter opposing end walls 19 and 20.

The initial solid cast block from which the connector is formed is machined internally between the parallel flat faces 14 and 15 to form a pair of intersecting, flat passageways or sockets each dimensioned to receive the bus bars with a substantially snug but freely sliding fit. One of the passageways 21 extends through the connector as best shown in Fig. 4 from one long wall 17 to its opposite long wall 18, and the other passageway 22 extends therethrough from the short end wall 19 to its opposite end wall 20. The passageways 21–22 are in parallel and relatively offset planes, the cross passageway 21 being adjacent to the front face 14, the longitudinal passageway 22 being adjacent to the rear face 15 and both passageways being in intercommunicating relation and exposed sidewise to each other at the center of the cross formed thereby as shown in Fig. 4.

It is suggested that the lower sides of the passageways, that is, the sides opposite the front face 14, be machined flat to provide an extensive metal-to-metal engagement between the connector and bus bars; it is also suggested that it be channeled, grooved or otherwise roughened in order to enhance the gripping of the bus bars thereto when forced into engagement therewith by the clamping screws hereinafter described or preferably the bottom face of the passageway 22 may be provided with narrow upstanding parallel and spaced apart ribs 23.

The top face 14 is provided with a plurality of threaded screw holes extending therethrough in the portions thereof overlapping the two passageways 21–22. There are eight of such screw holes arranged in pairs, one end pair 24 at the right end of passage 22 and another end pair 25 at the left end of the passage 22 as viewed in Fig. 5. The other two pairs 26 and 27 are in the central portion of the face 14 in the part thereof which overlaps the intersection of the two intersecting passageways 21 and 22.

Each screw hole or at least those which are to be used, is provided with a screw 28 threaded therein. These screws preferably are of the flat nose type each designed to provide a wide bearing engagement with the bus bar on which it bears as best shown in Fig. 5. It is intended that in the aggregate the screws coact to provide an extensive area of bearing surface on the several bars. The screws illustrated are of bronze and are of the flat-headed type and are dimensioned to have their outer ends flush with the top surface 14 or substantially so. They are tightened to effect a powerful clamping action on the bars by means of a large Allen type wrench. The several pairs of screw holes and their associated screws are disposed in staggered relation considered lengthwise of the face 14, and are disposed so that by proper selection at least two screws engage each bus bar irrespective as to how the bus bars may be inserted into the connector.

Instead of simply roughening the internal surfaces of the connector engaged by the bus bars, the forming of the spaced apart ribs 23 on the bottom face of the passageway 22 provides a highly effective form of line or bridging contact. It is noted that the ribs are arranged in pairs with a portion of the substantially rigid bus bar bridged across adjacent pairs to form a beam with the associated pair of screws bearing down on the beam so formed substantially mid-length between the supporting ribs. Thus, any two adjacent ribs are disposed in parallel relation on opposite sides of the line of thrust provided by the associated screw. This, of course, has a tendency to bow the bus bar in the areas between the adjacent pair of screws, as for instance, between the left pair 25 and the next adjacent pair 26 as viewed in Fig. 5.

The cross arrangement of passages herein disclosed permits all the usual necessary arrangement of the bus bars commonly used in forming grounding assemblies. As before noted, the two bars 11 and 12 are in end-to-end relation with bar 13 normal thereto to form a T in Fig. 1. If bar 13 was extended integrally and downwardly beyond the connector, the so crossed bars would form a cross. Bars 11 and 12 by themselves form a splice in the absence of the third bar 13.

It is a feature of this disclosure that the connectors are not directly supported from any of the walls W, or from the building framework. In addition to functioning as binding means between the bus bars, these connectors also function as spacing means for maintaining the bus bars in spaced relation to the walls which support them. The rear portion of the connector, that is, the material thereof between the rearmost passage 22 and the rear face 15, may be considered as a spacer.

The assembly of connectors and bars is supported from brackets 31 which engage the vertically extending, horizontally disposed bus bars and under-lap the same edgewise. The lower flange 33 of the bracket is bent forwardly and upwardly to form a concaved seat designated to receive and support the lower edge of the bus bar.

It is particularly noted that there are no holes drilled through the bus bars as has been known heretofore in this art and in this way the full conductive capacity of the bus bars is maintained. Even though there is presented a powerfully acting clamping engagement between the bars and connector, neither is distorted from its preformed configurations and, in this way, there is assurance that all parts will interfit in frictional interengagement when the system is fabricated in situ. It is also noted that the grid-forming bars are firmly connected one with the other and that the grid, considered as a whole, is mounted at a plurality of parts to the metal framework by means of the brackets herein disclosed. The connectors herein featured are utilized in the grounding system disclosed in the divisional application Serial No. 47,644, filed September 3, 1948.

We claim:

1. A connector for mechanically and electrically securing together a pair of flat bus bars comprising a one-piece block provided with two passageways extending therethrough at right angles to each other, each passageway being rectangular in cross section and fashioned so that the bus bars may have a snug but sliding fit therein, said passageways disposed with their width dimensions extending in adjacent parallel planes and open to each other crosswise in plan at their midlengths, whereby the bus bars therein will interengage with a flat face of one in electric contact with a flat face of the other, and said connector provided with a binding screw threaded through one side thereof and overlapping the area common to both passageways for engaging the adjacent bus bar to force the same into flatwise bearing engagement with the other bus bar and for causing said other bus bar to bear on the opposite side of the connector thereby to clamp both bus bars to each other and to the connector.

2. A connector for mechanically and electrically securing together a pair of flat bus bars, comprising a one-piece block provided with two passageways extending therethrough at right angles to each other, each passageway being rectangular in cross section and fashioned so that the bus bars may have a snug but sliding fit therein, said passageways disposed with their width dimensions extending in adjacent parallel planes and open to each other crosswise in plan at their midlengths, whereby the bus bars therein will interengage with a flat face of one in electric contact with a flat face of the other, said connector provided with eight screw holes arranged in pairs, with one end pair facing one end of the passageways and another end pair facing the other end of the same passageway, and two centrally located pairs overlapping the area common to both passageways, each of said centrally located pairs being offset transversely relative to the adjacent end pair and to each other, and broad end screws engaging in said screw holes for bearing on the flat side of the bus bar facing the same.

3. A connector for mechanically and electrically securing together a pair of flat bus bars, comprising a one-piece block provided with two passageways extending therethrough at right angles to each other, each passageway being rectangular in cross section and disposed with their width dimensions extending in parallel planes and said passageways open to each other adjacent their mid-lengths to form at their intersection a pocket having a depth equal to the sum of the depths of the two passageways, one side of the connector in the portion thereof overlapping the pocket provided with at least one bearing screw for engaging the adjacent bus bar and the opposite side of the connector in the portion thereof facing the pocket provided with at least two parallel and spaced-apart ribs extending across one of the passageways and against which one of the bus bars may be pressed by the action of the screw.

4. A block-like, one-piece connector having a passageway of greater width than depth extending therethrough for receiving therein a flat bus bar, a pair of binding screws threaded into one face of the connector for bearing on a side of the bus bar at two spaced-apart points and defining a plane of thrust operative to force the opposite side of the bus bar into engagement with the wall defining the opposite side of the passageway, said wall provided with a pair of integral, shallow parallel ribs projecting therefrom and adapted to be engaged by said opposite side of the bus bar, said ribs located on opposite sides of said plane of thrust whereby the screws when forcefully tightened can exert a pressure on the bus bar on the part thereof between the ribs in a tendency to bow the bar in the part bridged between the ribs into the space between the ribs.

5. A connector for mechanically and electrically securing together a pair of flat bus bars in overlapping relation, comprising a one-piece block-like casting of a highly conductive metal and having opposing flat sides, said connector provided with two passageways extending therethrough at right angles to each other, each passageway being rectangular in cross section and fashioned so that the bus bars may have a snug but sliding fit therein, said passageways disposed with their width dimension extending in adjacent parallel planes both parallel to said flat sides and open to each other crosswise in plan at their mid-lengths.

DONALD L. GREENE.
CARROLL A. BADEAU.

REFERENCES CITED

The following references are of record in the file of this patent:

UNITED STATES PATENTS

| Number | Name | Date |
| --- | --- | --- |
| 78,403 | Truesdell | May 26, 1886 |
| 353,984 | Smith | Dec. 7, 1886 |
| 1,373,716 | Dottl | Apr. 5, 1921 |
| 1,734,537 | Steinmayer | Nov. 5, 1929 |
| 1,943,660 | Edwards | Jan. 16, 1934 |
| 2,097,324 | Hill | Oct. 26, 1937 |
| 2,179,251 | De Right | Nov. 7, 1939 |